L. B. BRIDGES.
TYPEWRITING MACHINE.
APPLICATION FILED DEC. 22, 1917. RENEWED SEPT. 21, 1920.
1,375,358.
Patented Apr. 19, 1921.
3 SHEETS—SHEET 1.
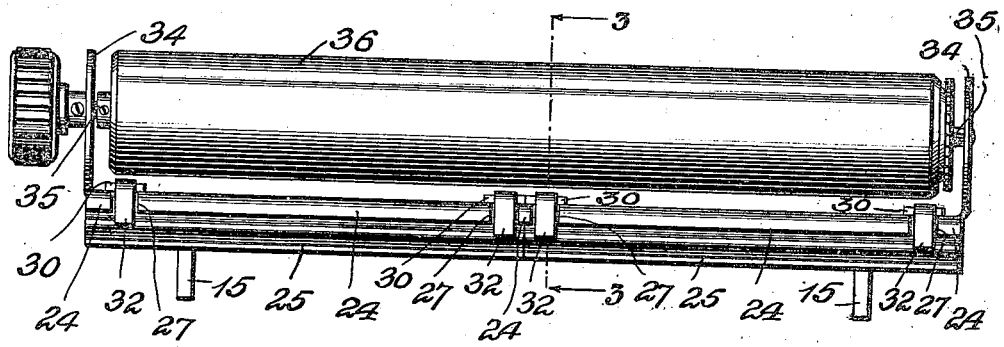
Fig. 1.
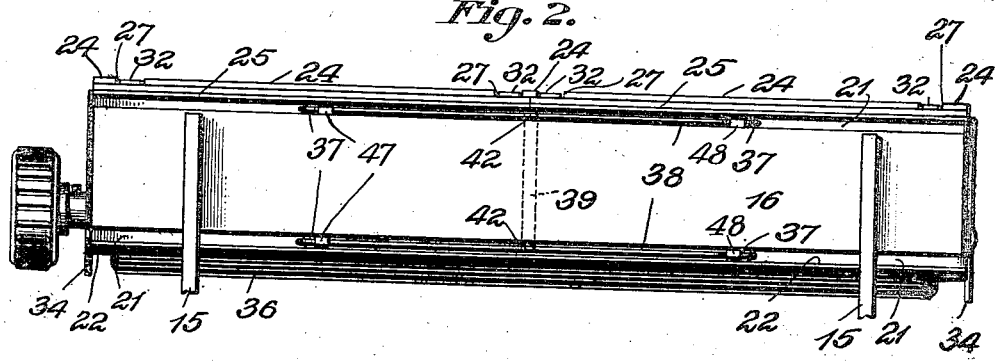
Fig. 2.
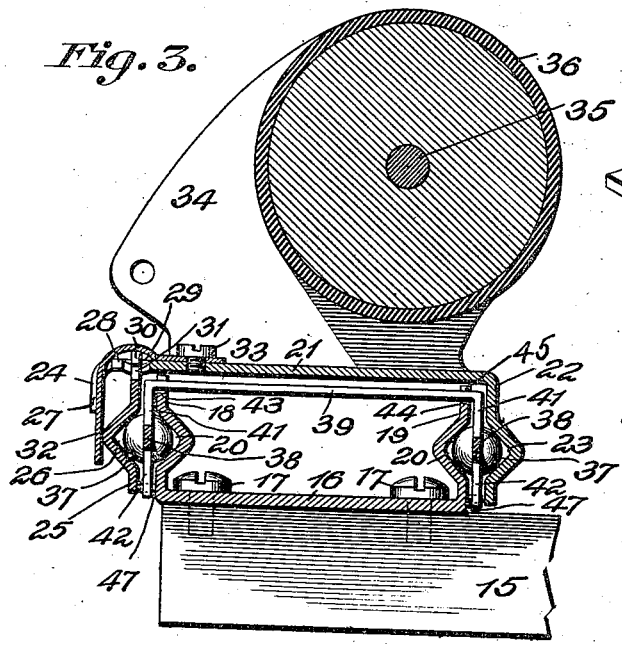
Fig. 3.
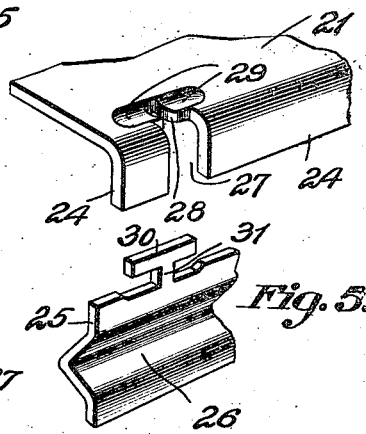
Fig. 4.
Fig. 5.
Inventor
Lewis B. Bridges
By Crandler Davis
his Attorneys

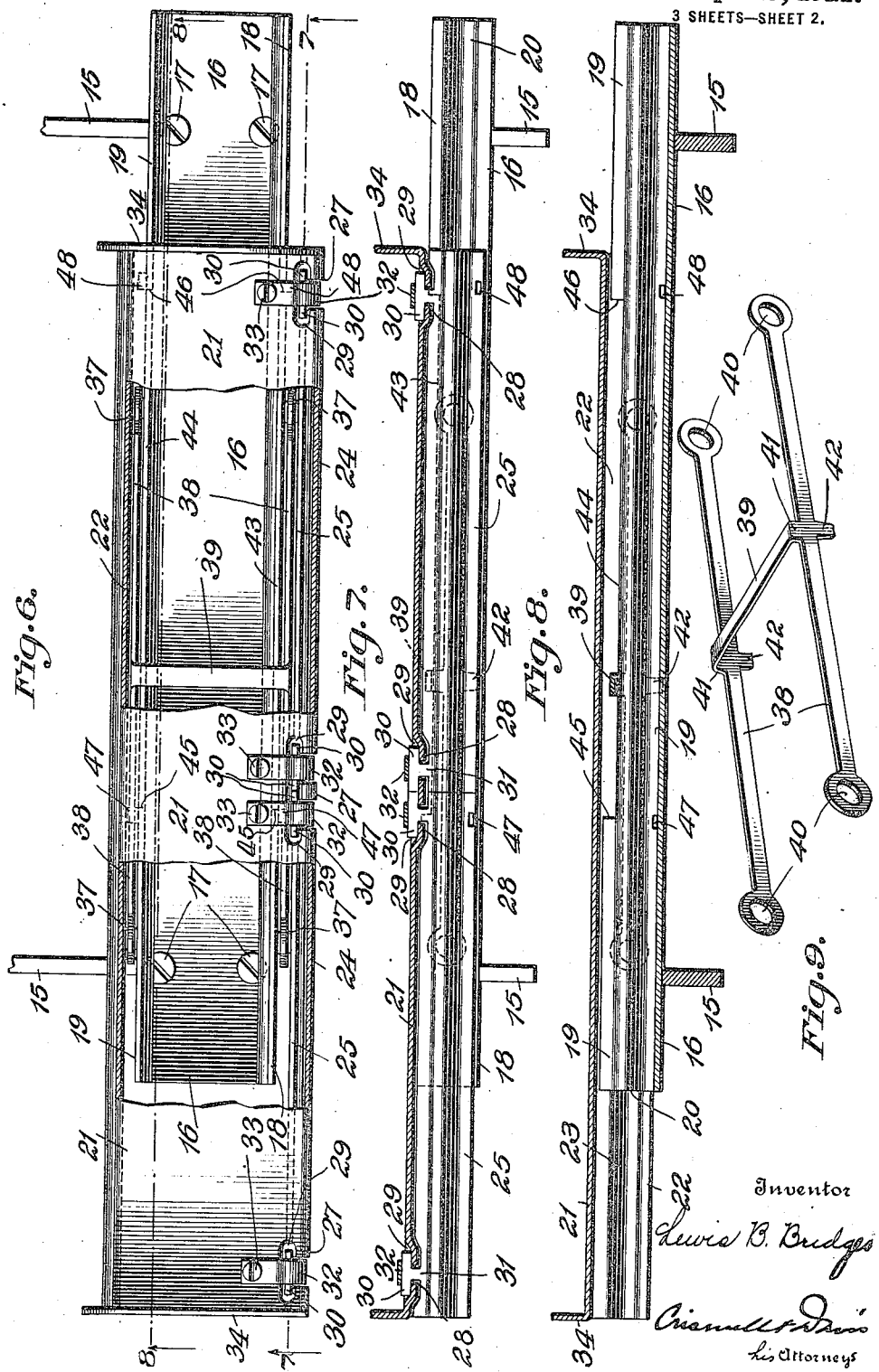

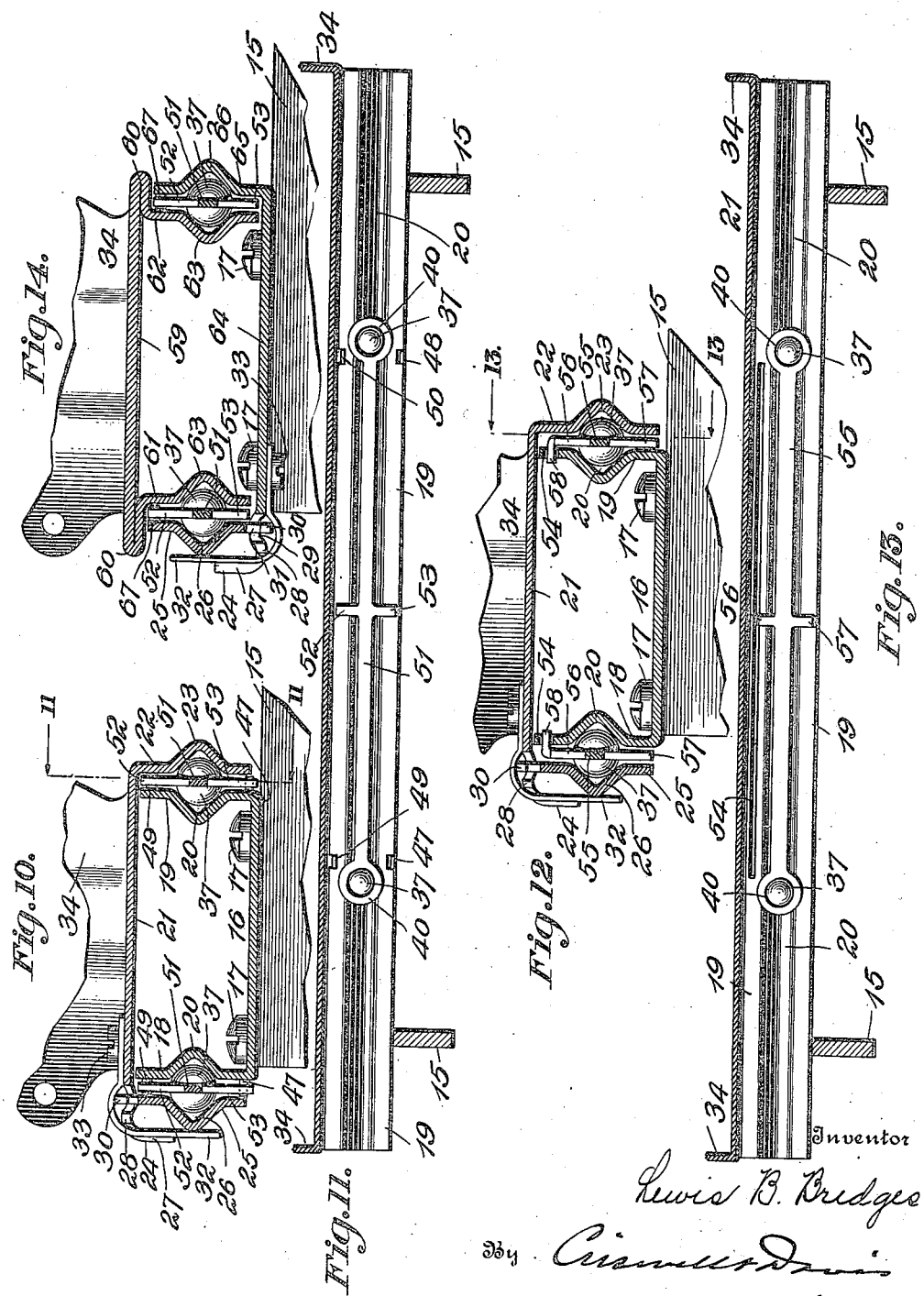

UNITED STATES PATENT OFFICE.

LEWIS B. BRIDGES, OF BROOKLYN, NEW YORK, ASSIGNOR TO CORONA TYPEWRITER COMPANY, INC., OF GROTON, NEW YORK, A CORPORATION OF NEW YORK.

TYPEWRITING-MACHINE.

1,375,358.             Specification of Letters Patent.     Patented Apr. 19, 1921.

Application filed December 22, 1917, Serial No. 208,403. Renewed September 21, 1920. Serial No. 411,813.

*To all whom it may concern:*

Be it known that I, LEWIS B. BRIDGES, a citizen of the United States, and a resident of the borough of Brooklyn, county of Kings, city and State of New York, have invented certain new and useful Improvements in Typewriting-Machines, of which the following is a specification.

One object of this invention is to provide an easy running anti-friction support for the platen of a typewriting machine that may be readily made of comparatively thin sheet metal so that the weight of the platen supporting means will be reduced to a minimum.

Another important object of the invention is to so construct the platen supporting means that it will be capable of withstanding thrusts and strains in all directions without injury to the parts and without displacing the anti-friction rolling elements.

A further important object of the invention is to provide a platen supporting structure in which both the traveling and the stationary members of the platen support may be formed of sheet metal and to provide one of said members with a yieldable or relatively movable raceway member or flange to permit easy running of the traveling member notwithstanding the presence of dirt, grit, or the like, in the raceways or the presence of slight inequalities, distortions, or imperfections in the raceway flanges or members.

A further object of the invention is to provide a yieldable raceway member formed of independently movable sections.

Other important objects of the invention are to provide means for spacing the anti-friction rolling elements fixed distances apart in the raceways; to provide means for preventing tilting and binding of the spacing means in the raceways; to provide means for preventing the anti-friction rolling elements from over-running the ends of the platen supporting members; to provide means for maintaining the rolling elements in pairs and directly opposite each other in the raceways; and to limit the travel of each pair of opposed rolling elements so that the elements of each pair traveling in the raceway having the divided yieldable member or flange will travel along a single section of the divided member or flange.

A further object is to provide simple spacing means connecting all the rolling elements and adapted to maintain the same in the same relative positions at all times.

Another object of the invention is to provide a platen supporting means in which practically all of the parts, including both the traveling and stationary members and the yieldable raceway member, may be readily stamped or otherwise formed from sheet metal and are so constructed as to be readily assembled.

In the drawings, Figure 1 is a rear elevation showing a platen-supporting structure embodying the invention in its preferred form;

Fig. 2 a bottom plan view thereof;

Fig. 3 a vertical section on the line 3—3 of Fig. 1;

Figs. 4 and 5 fragmentary perspective views showing the means of connecting the movable raceway flange to its supporting member;

Fig. 6 a top plan view showing the traveling member moved toward one limit of its travel, the traveling member being partly broken away;

Fig. 7 a vertical longitudinal section on the line 7—7 of Fig. 6;

Fig. 8 a vertical longitudinal section on the line 8—8 of Fig. 6;

Fig. 9 a perspective view of the ball-spacing means employed in the form of platen-supporting means shown in Figs. 1 to 8;

Fig. 10 a view similar to Fig. 3, showing a modified construction;

Fig. 11 a vertical longitudinal section on the line 11—11 of Fig. 10;

Fig. 12 a view similar to Fig. 10, showing a slightly modified construction;

Fig. 13 a vertical longitudinal section on the line 13—13 of Fig. 12; and

Fig. 14 a view similar to Fig. 10, showing another embodiment of the invention.

Referring to the embodiment of the invention illustrated in Figs. 1 to 9, inclusive, 15 designates a pair of frame bars or members upon which the bed plate or relatively stationary member 16 of the platen support is fixed by means of screws 17, or other suitable means. The frame bars 15 may be mounted to fold if desired, to permit the platen and its supporting means to be moved to a compact position when the machine is not in use in the same manner as in the Corona typewriter, or in any other desired manner. The bed plate or member 16 is stamped or otherwise formed of sheet metal and is provided at its longitudinal edges with upstanding integral raceway flanges 18 and 19, respectively, in each of which an outwardly facing raceway channel or groove 20 is formed by pressing the metal of the flanges inwardly.

The traveling or platen-carrying member of the anti-friction platen support is also formed of sheet metal. The base plate 21 of the traveling member extends over the bed or stationary member 16 and the longitudinal edges of the base plate 21 project beyond the upper edges of the flanges 18 and 19 on said member 16. The plate 21 is provided at its forward edge with a depending integral raceway flange 22 pressed or shaped to form an inwardly facing raceway channel or groove 23 coöperating with the channel 20 in the flange 19 on bed member 16. The plate 21 is formed at its rear edge with an integral depending flange 24, which serves to stiffen said plate and also forms a rigid limit stop or abutment for a movable or yieldable raceway flange 25 divided midway its length into two independently movable sections. The sections of the divided movable rail are formed of sheet metal and are pressed to form inwardly facing alined grooves or channels 26 coöperating with groove 20 in the flange 18 on the bed member 16.

Each section of the movable raceway flange or rail 25 is detachably held to plate 21 and has an interlocking rocking connection with said plate 21 adjacent the rear longitudinal edge of the plate. The flange 24 is cut away adjacent each end thereof and at two points substantially midway the length of the flange, as shown at 27, and the base plate 21 is formed with slots 28 extending forwardly from each of said cut-away portions 27, the slots 28 being narrower than portions 27, as shown more clearly in Fig. 4. The body of plate 21 is pressed downwardly to form short depressions or sockets 29 extending across the slots 28 and each section of the divided movable raceway flange or rail 25 is formed with T-heads or lugs 30 adjacent each end thereof adapted to engage in the depressions or sockets 29 with the narrow shanks or stems 31 thereof extending through slots 28. The T-heads or lugs are adapted to rock in the depressions 29 and slots 28 and form an interlocking rocking connection between the movable rail or flange sections 25 and the plate 21. Each section of the movable raceway flange or rail 25 is normally forced toward the flange 18 on bed member 16 by a pair of flat springs 32 held to the upper face of plate 21 by screws 33. Each spring 32 extends across one of the depressions 29, and over the T-head or lug 30 seated therein, and extends downwardly through the adjacent cut-away portion 27 in flange 24, the free lower ends of the springs pressing against the outer side of the movable rail or flange section.

The plate 21 is formed with integral upwardly extending end pieces or brackets 34 in which the shaft 35 of a platen 36 is journaled. A pair of anti-friction rolling elements or balls 37 are located in each raceway formed by channels 20 and 23 and channels 20 and 26, respectively. The balls of each pair are held in spaced relation and the two pairs of balls are maintained directly opposite each other at all times by means of a ball-spacing device comprising side bars 38, each of which is adapted to move longitudinally of one of the raceways, and a yoke or connecting bar 39 preferably formed integrally with the side bars and extending between said bars midway their length, as shown more clearly in Fig. 9. The side bars 38 of the spacing device are provided with eyes 40 at each end thereof adapted to receive the balls 37, and each bar is provided with an upwardly extending portion 41 and a depending portion or projection 42 midway its length, the ends of the connecting bar 39 being connected with the upper ends of the projections 41.

The upper edges of the flanges 18 and 19 are cut away at 43 and 44, respectively, intermediate their ends, and the connecting bar 39 of the spacing device is adapted to travel along the cut-away portions of the flanges, said cut-away portions being of such length that the edges of connecting bar 39 will strike against the shoulders 45 and 46 at the opposite ends of said cut-away portions when the plate 21 reaches the opposite limits of its travel and the balls 37 approach the ends of the bed member 16. If desired, lugs 47 may be stamped from flanges 18 and 19 adjacent the bottom thereof and below the shoulders 45 and similar lugs 48 may be stamped from said flanges below the shoulders 46, said lugs being adapted to be engaged by the depending projections 42 on the spacing device simultaneously with the engagement of bar 39 with said shoulders.

The shoulders 45 and 46 and lugs 47 and 48 are so positioned as to prevent the balls 40 from crossing the joint between the sections of the divided rail or flange 25, as well as to prevent over-running and loss of the balls at the ends of the bed 16. The spacing device is also constructed in such a way that tilting and binding of the side bars 38 in the raceways is prevented, and is also adapted to always maintain the balls in each raceway a fixed distance apart and to maintain the pairs of balls in the two raceways directly opposite each other at all times. The stop flange 27 serves to prevent abnormal rocking of the sections of the movable rail and to stiffen the traveling platen-carrying member, the function of this flange as a limit stop being important, since otherwise a forward thrust or pull on the platen or traveling platen-carrying member might, if sufficiently severe, swing the movable flange sections far enough backwardly to permit displacement of the anti-friction balls. The function of this flange 24 as a stiffening means is also of great importance, since I am thereby enabled to employ a sheet metal plate of minimum weight in forming the traveling platen-carrying member. It will be seen also that the springs 32 perform the double function of normally pressing the movable flange sections against the balls 37 and of assisting in holding said sections in assembled position on the traveling member 21.

Another important feature is that both raceways are covered at the top so as to largely prevent dirt, dust, or the like from falling into the raceways and interfering with the easy running of the traveling member, and it will be also noted that both raceways are entirely open at the bottom so that any dirt which may get into the raceways may readily drop out.

A further highly important feature of the invention is that the upper edges of the two integral raceway flanges 18 and 19 on the bed member extend close to the under face of the traveling platen-carrying plate 21, so as to thereby function as rigid abutments in case the plate 21 is forced toward the bed 16, thus preventing displacement of the traveling platen-carrying member or of the anti-friction balls by any excessive thrust of the plate 21 toward the bed plate 16 in whatever position the parts may be. This utilization of the two rigid raceway flanges on the bed plate as positive abutments for the platen-carrying plate 21 is particularly advantageous in connection with the Corona typewriting machine, in which the carriage structure is inverted when the machine is compacted, the platen being swung forwardly and dropped down on the keyboard frame.

In the modified construction shown in Figs. 10 and 11 all of the parts except as hereinafter described, are of substantially the same construction as shown in Figs. 1 to 9. In this construction the notches 43 and 44 in flanges 18 and 19 are omitted and lugs 49 and 50 are stamped from the upper edges of said flanges above the lugs 47 and 48. The connecting bar or yoke 39 of the spacing device is also omitted and two independent spacing bars 51 are employed. Each bar 51 is provided with ball-receiving eyes 40, and midway its length is also provided with an upwardly extending projection or lug 52 and a depending projection 53, said projections 52 and 53 being adapted to engage the lugs or stops 47, 48, 49 and 50 in the same manner as bar 39 and lugs 42 of the spacing device employed in the construction shown in Figs. 1 to 9. It will also be observed that the projections or arms 52 and 53 on the spacing bars 51 travel back and forth between the vertical or flat portions of the raceway flanges above and below the raceway channels or grooves, and thus serve not only to limit the travel of the space bars but also to prevent the bars from tilting laterally in either direction sufficiently to become caught or jammed in the raceway channels.

In the embodiment of the invention shown in Figs. 12 and 13, the construction is similar to that shown in Figs. 10 and 11, except that the stop lugs 47 and 48 at the base of flanges 18 and 19 are omitted, and instead of employing the stops or lugs 49 and 50 the flanges 18 and 19 are provided with elongated slots 54 intermediate their ends, and preferably adjacent the upper edges thereof, as shown. The slots 54 are of the same length as the cut-away portions 43 and 44 in the construction shown in Figs. 1 to 9, and the ends of said slots function as stops in the same manner as the shoulders 45 and 46 at the ends of said cut-away portions. The ball-spacing means employed in the construction shown in Figs. 12 and 13 is of substantially the same form as that shown in Figs. 10 and 11 and comprises a spacing bar 55 for each raceway formed with ball-receiving eyes 40 at each end, and also provided with an upwardly extending arm 56 and a depending arm 57 midway its length. The arms 56 of the spacing bars 55 are formed with inwardly bent upper ends 58 which extend loosely through slots 54 in flanges 18 and 19 and are adapted to abut against the end walls of said slots to limit the travel of the spacing bars, for the purposes heretofore described. The arms 56 and 57 function also as tilting preventing means for the spacing bars 55 in the same manner as the arms 52 and 53 on bars 51 in the construction shown in Figs. 10 and 11.

In the construction shown in Fig. 14, the traveling platen-carrying member is formed with two integral rigid raceway flanges and the bed member is formed with one integral raceway flange, a divided movable raceway flange, and a rigid stiffening and stop flange. In this construction the flanges on the traveling member are embraced or inclosed by the flanges on the bed member. The general arrangement is therefore substantially the reverse of the constructions heretofore described. The traveling member 59 is bent back upon itself to form doubled portions 60 projecting outwardly beyond the integral depending flanges 61 and 62, pressed to form outwardly facing raceway channels 63. The bed member 64 is formed with an integral upwardly extending raceway flange 65 along its forward edge pressed to form an inwardly facing ball channel 66. A movable divided rail 25, formed with a ball channel 26, is held to the bed member 64, and said member 64 is formed with a longitudinal stiffening flange 24 along its rear edge which also serves as a limit stop for the sections of the movable rail. The rail or flange 25 and flange 24 are of the same construction as that shown in Figs. 1 to 8 and perform the same functions as the corresponding parts shown in said Figs. 1 to 8. The sections of the movable raceway rail or flange are normally pressed toward the flange 61 by springs 32 held to the bed 64 by screws 33. The ball-spacing bars 51 are of the same construction as spacing bars 51 shown in Figs. 10 and 11 and operate in the same manner, said bars being formed with arms 52 and 53 adapted to prevent excessive tilting of the bars. The arms 52 on the bars 51 are also adapted to abut against stops or lugs 67 stamped or otherwise formed on the movable raceway flange 25 and raceway flange 65 at points corresponding with the location of lugs 49 and 50 on flanges 18 and 19 in the construction shown in Figs. 10 and 11. The doubled projecting edge portions 60 of the traveling member 59 serve to stiffen said member, and also serve to cover the upper edges of the raceways and thus tend to prevent the accumulation of dirt in the raceways. The lower edges of the rigid integral flanges 61 and 62 on the traveling member extend close to the upper face of the bed member and serve to prevent said members from being forced toward each other sufficiently to cause displacement of the traveling member or of the anti-friction devices.

What I claim is:

1. A platen-supporting structure for a typewriting machine comprising a traveling platen-carrying member provided with a pair of raceway rails, a bed member provided with a pair of raceway rails coöperating with the rails on the traveling member to form raceways, the rails on one of said members being rigid and immovable relatively to the member and both having their edges extending into close proximity to the adjacent face of the other member and adapted to engage the same to prevent movement of the members toward each other, and anti-friction rolling elements in the raceways.

2. A platen-supporting structure for a typewriting machine comprising a sheet metal traveling platen-carrying plate provided with a pair of flanges formed with raceway channels, a sheet metal bed plate provided with a pair of flanges formed with raceway channels coöperating with the channels in the flanges on the traveling plate to form raceways, the flanges on one of said plates being formed integrally therewith and both having their edges extending into close proximity to the adjacent face of the other plate and adapted to engage the same to prevent movement of the plates toward each other.

3. A platen-supporting structure for a typewriting machine comprising a sheet metal bed plate provided at its longitudinal edges with a pair of integral upstanding flanges each formed with a raceway channel in its outer face, a sheet metal traveling platen-carrying plate provided with depending flanges inclosing the flanges on the bed plate and formed with raceway channels in their inner faces, and antifriction rolling elements in the raceways formed by said channels.

4. A platen supporting structure for a typewriting machine, comprising a sheet metal bed plate provided at its longitudinal edges with a pair of integral upstanding flanges each formed with a raceway channel in its outer face, a sheet metal traveling platen-carrying plate provided with depending flanges inclosing the flanges on the bed plate and formed with raceway channels in their inner faces, one of said flanges on the traveling plate being yieldable, and antifriction rolling elements in the raceways formed by said channels.

5. A platen-supporting structure for a typewriting machine, comprising a bed plate having a pair of integral upstanding flanges formed with raceway channels, a traveling platen-carrying plate provided with a pair of depending flanges formed with raceway channels, one of said depending flanges being resiliently pressed toward its companion bed-plate flange, and rolling elements in the raceways.

6. A platen-supporting structure for a typewriting machine, comprising a bed plate having a pair of integral upstanding flanges formed with raceway channels, a traveling platen-carrying plate provided with a pair of depending flanges formed with raceway channels, one of said depending flanges being divided into independently movable sections, means for yieldably forcing each section of said divided flange toward its companion bed-plate flange, and rolling elements in the raceways.

7. A platen-supporting structure for a typewriting machine, comprising a bed member formed with raceway channels, a platen-carrying member provided with a rigid raceway rail and a movable raceway rail having channels coöperating with the channels on the bed member, said platen-carrying member being formed with notches in one edge thereof and said movable rail being provided with headed projections on one edge the shanks of which extend through said notches, springs held to said platen-carrying member normally pressing the movable rail in one direction, and rolling elements in the raceways formed by said channels.

8. A platen supporting structure for a typewriting machine comprising a relatively stationary member formed with raceway channels, a traveling platen-carrying member provided with a rigid raceway rail and a movable raceway rail having channels coöperating with the channels on the stationary member to form raceways, said traveling member being formed with a longitudinal flange forming a stop limiting the movement of said movable rail in one direction, means forming a rocking connection between the movable rail and said traveling member, springs held to said traveling member and normally forcing said movable rail away from said stop flange, and rolling elements in the raceways.

9. A platen supporting structure for a typewriting machine, comprising a bed member formed with raceway channels, a platen-carrying member provided with a rigid raceway rail and a movable raceway rail having channels coöperating with the channels on the bed member, said platen carrying member being formed with depressions adjacent one edge thereof and with slots extending inwardly into said depressions, and said movable rail being provided with headed projections on one edge thereof the shanks of which extend through said slots and the heads of which engage in said depressions, springs held to said platen-carrying member normally forcing the movable rail in one direction, and rolling elements in the raceways formed by said channels.

10. A platen supporting structure for a typewriting machine, comprising a bed member formed with raceway channels, a platen-carrying member provided with a rigid raceway rail and a movable raceway rail having channels coöperating with the channels on the bed member, said platen-carrying member being formed with depressions adjacent one edge thereof and with slots extending inwardly into said depressions, and said movable rail being provided with headed projections on one edge thereof the shanks of which extend through said slots and the heads of which engage in said depressions, springs held to said platen-carrying member and extending over the heads of said projections and through said slots into engagement with the outer side of the movable rail, and rolling elements in the raceways formed by said channels.

11. A platen supporting structure for a typewriting machine, comprising a bed member formed with raceway channels, a platen-carrying member provided with a rigid raceway rail and a movable raceway rail having channels coöperating with the channels on the bed member, said platen-carrying member being formed with depressions adjacent one edge thereof and with slots extending inwardly into said depressions, and said movable rail being provided with headed projections on one edge thereof the shanks of which extend through said slots and the heads of which engage in said depressions, means held to said platen-carrying member for normally pressing the movable rail in one direction, said platen-carrying member being formed with a longitudinal flange forming a stop for limiting the movement of said movable rail against the pressure of said pressing means, and rolling elements in the raceways.

12. A platen supporting structure for a typewriting machine, comprising a relatively stationary member and a traveling platen-carrying member each provided with a pair of raceway rails having raceway channels therein, one of said rails on one of said members having an interlocking rocking connection with its supporting member and said member being formed with a longitudinal flange for limiting the rocking movement of said rail in one direction, means for normally forcing said movable rail toward its companion rail, and rolling elements in the raceways formed by said channels.

13. A platen supporting structure for a typewriting machine comprising a relatively stationary member and a traveling member, each of which is provided with a pair of raceway rails, one of said members being formed with a longitudinal flange at one edge and having slots extending inwardly into the same through said flange adapted to receive the shanks of headed projections formed on the edge of one of the rails on said member, means for normally forcing said last-mentioned rail toward its companion rail and away from said flange, and rolling elements in the raceways.

14. A platen supporting structure for a typewriting machine, comprising a sheet metal bed plate formed with a pair of integral upstanding raceway flanges, a sheet metal traveling platen-carrying plate provided with an integral depending raceway flange and a detachable depending raceway flange, said detachable flange being provided with headed projections on its upper edge the shanks of which extend through notches in one edge of said plate and the heads of which engage in depressions in said plate at each side of said notches to form rocking connections, anti-friction rolling elements in the raceways, and means for yieldably forcing the rocking raceway flange toward its companion raceway flange, 15. A platen supporting structure for a typewriting machine, comprising a pair of relatively stationary raceway members, a traveling member having a rigid raceway member and a raceway member shiftable toward and from its companion stationary raceway member, yieldable means tending to normally move said shiftable raceway member toward its companion stationary raceway member, and anti-friction rolling elements in the raceways.

16. A platen supporting structure for a typewriting machine, comprising a pair of relatively stationary raceway members, a traveling member having a rigid raceway member and a divided raceway member having sections independently shiftable toward and from its companion stationary raceway member, means for yieldably forcing each section of the divided member toward its companion stationary member, and anti-friction rolling elements in the raceways.

17. A platen supporting structure for a typewriting machine, comprising a traveling carriage having a raceway channel at one side and a divided raceway member at its opposite side having independently rockable sections held to the carriage and formed with a raceway channel, relatively stationary supporting means having raceway channels coöperating with the raceway channels on the carriage and divided raceway member, yieldable means tending to normally rock the sections of the divided raceway member toward its companion raceway channel on the supporting means, and anti-friction rolling elements in the raceways formed by said channels.

18. A platen-supporting structure for a typewriting machine, comprising a sheet metal bed member formed with flanges having raceway channels in their outer faces, a sheet metal platen-carrying member formed with flanges inclosing the flanges on the bed member and having raceway channels in their inner faces, anti-friction rolling elements in each of the raceways formed by said channels, means for positively maintaining all of said rolling elements in fixed relation to each other, and abutments on the flanges on said bed member adapted to coöperate with a centrally disposed abutment on said last-mentioned means to limit the travel of the rolling elements in either direction.

19. A platen supporting structure for a typewriting machine, comprising a traveling carriage having a raceway channel at one side thereof and a divided raceway member at its opposite side having independently movable sections held to the carriage and formed with a raceway channel, relatively stationary supporting means having raceway channels coöperating with the channels on the carriage and divided raceway member, yieldable means normally forcing the sections of the divided member toward its companion channel on the stationary supporting means, anti-friction rolling elements in the raceways formed by said channels, and means for confining the travel of each element in the raceway having the divided member to one section of said divided member.

20. A platen supporting structure for a typewriting machine, comprising a traveling carriage having a raceway channel at one side thereof and a divided raceway member at its opposite side having independently movable sections held to the carriage and formed with a raceway channel, relatively stationary supporting means having raceway channels coöperating with the channels on the carriage and divided raceway member, yieldable means normally forcing the sections of the divided member toward its companion channel on the stationary supporting means, anti-friction rolling elements in the raceways formed by said channels, a spacing device for maintaining each rolling element in one raceway opposite a rolling element in the other raceway, and spaced means on the stationary supporting means for limiting the travel of said spacing device to confine the travel of each element in the raceway having the divided member to one section of said member.

21. A platen supporting structure for a typewriting machine, comprising a relatively stationary member having upstanding raceway flanges, a traveling member formed with depending raceway flanges inclosing the flanges on the stationary member, rolling elements in the raceways, and a spacing device for the rolling elements comprising longitudinal space bars in the raceways having means at the ends thereof embracing the rolling elements and a rigid bar connecting said space bars midway their ends, the flanges on the stationary member having cut-away portions intermediate their ends forming spaced abutments adapted to be engaged by said connecting bar to limit the travel of the spacing device.

22. A platen supporting structure for a typewriting machine, comprising a relatively stationary bed having upstanding flanges formed with raceway channels, a traveling carriage having depending raceway flanges inclosing the flanges on the bed, one of said flanges being yieldable, rolling elements in the raceways, spacing bars in each raceway having eyes to receive the rolling elements, a transversely extending bar connecting said spacing bars midway their ends, and spaced stops on the bed adapted to be engaged by said transversely extending bar to limit the travel of the rolling elements.

23. A platen supporting structure for a typewriting machine, comprising a bed having a pair of integral upstanding flanges formed with raceway channels, a traveling carriage having a pair of depending flanges formed with raceway channels, one of said depending flanges being divided into independently movable sections, means for yieldably forcing each section of the divided flange toward its companion flange on the bed, rolling elements in the raceways, and means for confining the travel of each rolling element in the raceway having the divided flange to one section of said flange.

24. A platen supporting structure for a typewriting machine, comprising a bed member formed with longitudinal flanges having raceway channels therein, a platen-carrying member provided with a rigid flange and a yieldable flange both having raceway channels therein, anti-friction rolling elements in the raceways, bars in the raceways for holding the rolling elements in spaced relation, abutments on the flanges on the bed member, and means carried by said bars intermediate the ends thereof adapted to engage said abutments to limit the travel of the rolling elements in each direction.

25. A platen supporting structure for a typewriting machine, comprising a bed member formed with longitudinal flanges having raceway channels therein, a platen-carrying member provided with a rigid flange and a yieldable flange both having raceway channels therein, anti-friction rolling elements in the raceways, bars in the raceways for holding the rolling elements in spaced relation, abutments on the flanges on the bed member, and means carried by said bars intermediate the ends thereof adapted to prevent lateral tilting of the bars and adapted to engage said abutments to limit the travel of the rolling elements.

26. A platen-supporting structure comprising a bed member formed with raceway flanges, a platen-carrying member formed with raceway flanges, anti-friction rolling elements in the raceways formed by said flanges, one of said flanges being divided into independently yieldable sections, means for spacing the rolling elements in the raceways, and coöperating means carried by the spacing means and the bed member for confining the travel of each rolling element in the raceway having the divided flange to a single section of the divided flange.

27. A platen-supporting structure comprising a bed member formed with raceway flanges, a platen-carrying member formed with raceway flanges, anti-friction rolling elements in the raceways formed by said flanges, one of said flanges being divided into independently yieldable sections, means for spacing the rolling elements in the raceways, abutments on the flanges on the bed member, and means carried by the spacing means midway the length thereof adapted to engage said abutments to confine the travel of each rolling element in the raceway having the divided flange to a single section of said flange.

28. In a typewriting machine, the combination of a support, platen-carrying means, and an anti-friction bearing interposed between the support and platen-carrying means comprising two raceways, groups of opposed rolling elements in the raceways, one member of one raceway being divided into independently yieldable sections, means for positively maintaining the elements of each group opposite each other at all times, and means for confining the travel of each element to one section of the divided raceway member.

29. An anti-friction support for a platen, comprising two relatively movable members provided with coöperating pairs of raceway flanges, one of the flanges being divided into sections movable independently toward and from its coöperating flange, a plurality of anti-friction balls confined in the raceways formed by the flanges, and a spacing device for maintaining the balls in each raceway in spaced relation and for maintaining each ball in one raceway opposite a ball in the other raceway.

30. An anti-friction support for a platen, comprising two relatively movable members provided with coöperating pairs of raceway flanges, one of the flanges being divided into sections movable independently toward and from its coöperating flange, a plurality of anti-friction balls confined in the raceways formed by the flanges, a spacing device for maintaining the balls in each raceway in spaced relation and for maintaining each ball in one raceway opposite a ball in the other raceway, and means coöperating with said spacing device for limiting the travel of each ball in the raceway having the sectional flange to a single section of said flange.

This specification signed this nineteenth day of December, A. D. 1917.

LEWIS B. BRIDGES.